ELECTRONIC COUNTERS OF ELECTRICAL PULSES

Filed Nov. 14, 1951 2 Sheets-Sheet 1

INVENTOR.
CLAUDE MARIE EDMOND MASSON
BY
Therd[illegible]
ATTORNEY

INVENTOR.
CLAUDE MARIE EDMOND MASSON
BY [signature]
ATTORNEY 2,727,991
Patented Dec. 20, 1955

2,727,991

ELECTRONIC COUNTERS OF ELECTRICAL PULSES

Claude Marie Edmond Masson, Paris, France, assignor to Societe d'Electronique et d'Automatisme, Courbevoie, France Application November 14, 1951, Serial No. 256,252

3 Claims. (Cl. 250—27)

The present invention relates to electronic counters of electrical pulses of the kind comprising a cascade-connection of bi-stable trigger stages established by means of interstage coupling networks such that each stage, when triggered from its work condition to its rest condition, triggers its next following stage from its set condition to the other condition, whether that set condition is rest or work.

Such trigger stages comprise, as well known, two electron discharge tubes reciprocally coupled by means of networks of a predetermined time constant extending from the plate of one tube to the control grid of the other, and vice versa. In a definite condition of such a stage, one of these tubes is unblocked or "on," the other is blocked or "off," and conversely for the other condition of stability. The change-over of the condition of a trigger stage is controlled by applying an electrical impulse of suitable polarity to a control electrode of one of its tubes: in practice, it has been recognized to be of advantage to impress such an actuation pulse with negative polarity on a control electrode of the unblocked tube of a stage desired to be changed from the set condition to its other condition.

Further, in electronic counters of the kind specified above, the actuation input of any stage is, generally speaking, formed as a symmetrical actuation input, any actuation pulse being applied to both the chosen control electrodes of the tubes, so that, when for instance that applied pulse is of negative polarity, it actuates the trigger stage by acting on the unblocked tube, blocking that tube; thus through the time constant network extending from the plate of that tube a positive pulse is applied to the grid of the other tube, which since it was blocked, is now unblocked.

In a "modulo-2" or "binary" electrode counter, in which each trigger stage is mounted as a "scale-of-two" circuit, each stage must trigger the following one only after the reception of two incoming pulses. An output from only one of its two tubes is connected to the symmetrical actuation input of the following stage, and that output is chosen to be the one which delivers an actuation pulse of the chosen polarity when said stage passes from its work condition to its rest condition, conditions which are otherwise defined arbitrarily. Thus, for instance, if one chooses the negative polarity as the actuation polarity of pulses, the output of a stage to an interstage coupling connection or network consists of the output of the tube which is normally unblocked when the stage is in its rest condition.

Furthermore a bi-stable trigger stage of the kind concerned can be also actuated by driving its two tubes separately. Once the actuation polarity is defined, it is quite clear that for driving the trigger stage, a pulse which is only applied to a control electrode of a single tube of the stage will only be operative for triggering that stage if that tube is in a definite condition, "on" or "off" according to the polarity of the pulse; otherwise this pulse cannot be operative and the set condition of the stage will remain unchanged. A negative pulse, for instance, will have no driving action at all if it is applied to a tube in its off-condition, but it will actuate the trigger stage if applied to a tube in its on-condition.

Both symmetrical and asymmetrical drives can be simultaneously applied to a trigger stage; for instance symmetrical actuation occurs by application of pulses to both the control grids or both the plates of the pair of tubes of a stage; asymmetrical actuation occurs on a single plate or a single control grid, respectively. If then a trigger stage has been driven from one of its conditions of stability to the other one by an actuation pulse applied to its symmetrical input, that stage can be reset to its former condition either by a further actuation pulse on that symmetrical input or by another or return pulse on its asymmetrical input, provided for such a specialized resetting.

The invention has for its object to provide electronic counters of the kind specified, such that starting in operation from a general reset condition, as defined by an arbitrary choice of a rest condition for each of its trigger stages, common for all, the counter, upon reception of a pulse at its input, will present a number of trigger stages in their work condition equal to the number of pulses received up to and including the last pulse concerned. In other words, and object of the invention is to provide impulse counters of the kind specified which operate in so-called "step-by-step" fashion and indicate the number of counted impulses and not the rank of an incoming pulse, as usual.

Another object of the invention is to provide electronic counters of the kind specified such that, with their operation starting from a general condition of rest, they will present at the end of the counting operation as many stages in work condition as pairs of incoming pulses have been counted; the first stage when actuated will indicate the presence of a pulse additional to that number of pairs of incoming pulses.

Another object of the invention is to provide electronic decade counters from counters of pairs of incoming pulses, whether a series of pulses is applied to the input of the first stage or whether coded trains of pulses, representing numbers and carrying the numerical values from 0 to 9, are applied through specialized inputs to certain trigger stages of such decade counters; these counters, therefore, when comprising a plurality of decades in cascade-connection, can be used for recording and totalizing numerical values from such coded trains of pulses.

A more specific object of the invention is a counter chain of the step by step type described above in which in addition to the usual interconnections between stages of a counter of the binary progression type, there are feed back connections from each of the stages to the preceding stage of the chain, thereby to assure return to work of a trigger stage, return to rest of which had caused actuation to work of the next following trigger stage.

Still more specifically, any desired number of trigger stages are cascade coupled by inter stage connections extending from the output of the tube, the change in condition of which controls the changeover of the stage from rest to work to a symmetrical input of the following stage. These stages are also coupled by feed back connections extending from the output of the tube the change in condition of which controls the changeover of the stage from work to rest, through an individual or particular actuation input of the preceding stage to a tube in that stage controlling changeover from rest to work.

In a preferred embodiment of the invention, actuation pulses of negative polarity are applied and in such a counter the connections of direct progression will extend from the output of the tube which is unblocked in the rest position of a stage, to a symmetrical actuation input of the following stage, while the feed back connections will extend from the output of the tube which is blocked in the rest position of a stage to the particular actuation input of the tube in the preceding stage which is unblocked in the rest position of that stage.

In another embodiment of the invention a step by step counter of such structure is convertible into a step by step counter of pairs of pulses by simply omitting the feed back connection between second and first stages of the chain. As a result the first trigger stage will operate as a binary trigger stage and deliver to the second stage only one pulse for two consecutive pulses applied to the input of the first stage.

A further embodiment of a decade counter is realized by letting only four stages follow a binary input stage, and providing these four stages with feed back connections. Such decade may be utilized equally well either to count pulses applied to the input of the binary stage or to register and totalize pulse trains representing numbers 0 to 9, coded in the form of five consecutive significant elements 1, 2 2 2 2, provided that individual actuation inputs for the stages are established in addition to the actuation input of the first stage.

Throughout the following description, it will be assumed that a trigger stage will be actuated from rest to work as well as from work to rest by using negative pulses to change a tube from on-condition to off-condition.

Figure 1:
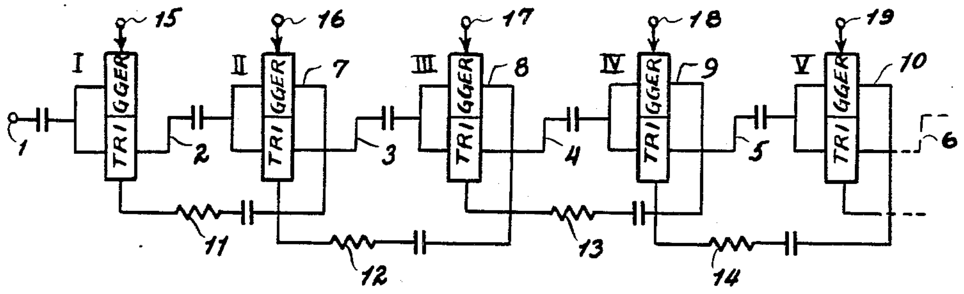
Fig. 1 shows part of an electronic counter according to the present invention, in a conventional representation of its trigger stages.

Fig. 1 shows five trigger stages in cascade-connection. These stages are designated as I to V. The first trigger stage, I, is provided with a symmetrical actuation input on both its tubes, as indicated at 1. Coupling connections 2, 3, 4, 5 represent the output terminals of the tubes of the trigger stages which are unblocked in the rest condition of stages I to IV, and these connections control or drive the symmetrical actuation inputs of the following stages II to V, respectively. At 6 these is indicated the output terminal of the last shown trigger stage V, which may be connected to a next following stage (not shown).

The output indicated at 7 of the tube which is blocked in the rest condition of stage II is provided with a back-coupling or feed back connection comprising a network 11 the time constant of which is determined at least as equal to the triggering time of a stage. This feed back connection is applied to an input for resetting stage I into work condition, i. e. that tube of stage I which is normally unblocked in its rest condition. Such a feed back connection is repeated throughout the cascade arrangement: from output 8 of stage III through network 12 to stage II; from output 9 of stage IV through network 13 to stage III; from output 10 of stage V through network 14 to stage IV; and so on up to the last trigger stage of the counter.

Parts 15 to 19 represent reset inputs for the application of resetting pulses or voltage changes to the respective trigger stages, to be used when a counting operation has been terminated and the counter has to be cleared for a new count.

Starting the operation from an overall rest condition of the trigger stages, the first incoming pulse at 1 triggers stage I to its work condition. The pulse outgoing at this instant over connection 2 cannot operate trigger stage II as it is of the wrong polarity. When choosing a negative polarity for actuation of the trigger stages, the tube of stage I from which interstage connection 2 is derived, is blocked when the first incoming pulse applied at 1, delivers a positive pulse which cannot actuate the second trigger stage, II, of the counter.

The second incoming pulse at terminal 1 resets the first trigger stage I to its rest condition. An actuation negative pulse is transmitted at 2 and the second trigger stage, II, is triggered to its work condition. The positive pulse thus generated at 3 cannot operate the next following stage, III, of the counter, but the negative pulse delivered at output 7 of stage II is fed back through network 11 to the unblocked tube of first stage I and blocks this tube again, whereby the first stage is immediately triggered back to its work conidtion. Two incoming pulses have been received and the two first stages of the counter are in work condition.

The third incoming pulse at 1 is applied to the first stage I which is in its work condition. Stage I is thus reset to its rest condition, whereby the second stage, II, is also reset to its rest condition, but stage III is then actuated by the negative pulse delivered at 3. This third stage, III, assumes work condition and delivers at output 3 a negative pulse which through network 12 is fed back to stage II. This last stage is reset to its work condition and in turn, through the negative pulse delivered at output 7, returns the first stage I to its work condition. Three incoming pulses have been received and three trigger stages I, II, III are in their work condition.

The same process is repeated for each further incoming pulse: any of these pulses when applied to stage I, triggers in a cascaded way to rest condition all stages of the counter which were previously actuated to work condition; thereafter a further step is taken by the counter in triggering a further stage to work condition; then through a reversed cascade of feed back actions, all the stages which have been reset to rest condition are returned to work condition. At any time of the count, the counter has a number of stages in work condition equal to the number of received pulses.

If the electronic counter concerned has N stages thus connected in cascade, after having received N incoming pulses, it will be filled, all stages being in their work condition. It is then to be noted that the $(N+1)$th incoming pulse will clear it. For instance in a five stage counter, the fifth stage will not receive any feed back input. Since these five stages are in work condition, the sixth incoming pulse at 1 will reset them to rest condition according to the normal direction of advance of the count. The fifth stage will deliver an output or "carry" pulse to another circuit or counter but will remain in rest condition; it cannot initiate by itself the reverse cascade of back-count. All stages remain in rest condition. A general "reset" of the counter can thus be obtained, in a simple way, by applying the general reset pulse to the normal actuation input of that counter.

If, however, it is desired that an unfilled counter be reset to a general rest or zero count condition, it becomes necessary to resort to individual resetting of the trigger stages. This can be done by applying resetting pulses to specially adapted inputs 15, . . . 19, . . .; since this resetting pulse is simultaneously applied to all these terminals, it will be operative only for the trigger stages in which that pulse is applied to a tube in its on-condition; when arriving at a tube in off-condition, the pulse will merely confirm the rest condition of the stage comprising said tube.

Figure 2:
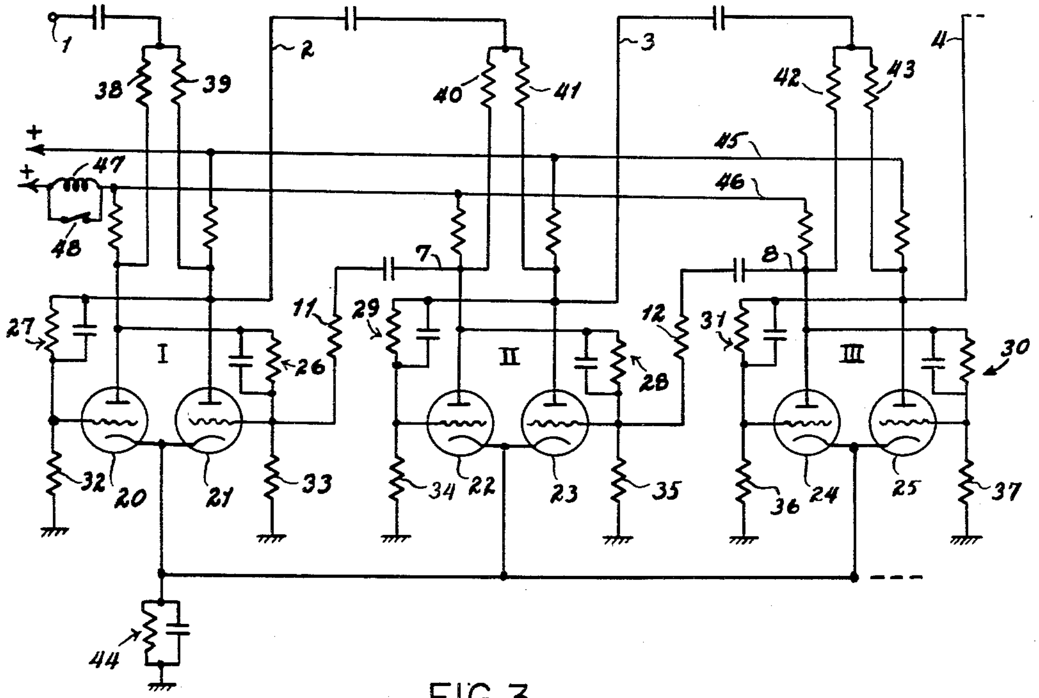
Fig. 2 illustrates part of an embodiment of an electronic counter according to the invention, in a preferred form of the circuit of the trigger stages.

An illustrative but preferred embodiment of an electronic counter according to the invention is now shown in Fig. 2, featuring only the three first stages I, II, III of the counter. Each trigger stage is a flip-flop stage and actuated by a symmetrical drive inserted in the plate connections of its tubes.

The paired tubes 20—21, 22—23, 24—25 of the three trigger stages I, II, III, are interconnected by means of usual networks of bistable trigger stages, more specifically flip-flop stages, according to a well-known arrangement.

For instance, the plate of tube 20 is connected to the control grid of tube 21 through a parallel resistance-capacity network 26 and the plate of tube 21 is conversely connected to the control grid of tube 20 through resistance-capacity network 27; the control grids of both tubes 20 and 21 are grounded through self-biasing resistors 32 and 33, respectively. Both cathodes of tubes 20 and 21 are connected in common over the self-biassing network 44 to the ground. This circuit 44 is made common to all the trigger stages. Tubes 22—23 and 24—25 of trigger stages II and III are similarly interconnected by means of networks 28—29 and 30—31, control grid resistors 34—35 and 36—37 and cathode network 44.

The input terminal 1 of the counter is connected to both plates of tubes 20 and 21 through respective resistors 38 and 39, in parallel connection. The output connection 2 from stage I is similarly connected to both plates of tubes 22 and 23 through respective resistors 40 and 41. The output connection 3 of stage II is also similarly connected to both plates of tubes 24 and 25 through resistors 42 and 43; and so forth for further trigger stages of the counter.

Interstage connection 2 is taken from the plate of tube 21; interstage connection 3 is derived from the plate of tube 23; interstage connection 4 from the plate of tube 25. When stages I, II and III are in rest condition, tubes 21, 23 and 25 are those in work condition.

Battery voltage is applied to the plates of tubes 20, 22, 24, . . . through conductor 46; the same battery voltage is applied to the plates of tubes 21, 23, 25, . . . through conductor 45. However, a series inductance 47 is inserted in conductor 46. This inductance is normally short-circuited by a contact switch 48. Such an arrangement allows the general resetting of the counter. Upon opening of contact switch 48, the battery is connected to inductance 47 and current flows through that inductance. The resulting voltage change causes a sudden change in the plate voltage of tubes 20, 22, 24, . . . such that those of the tubes which were unblocked, will be blocked, thus returning the associated trigger stages to rest condition. Such a resetting arrangement has been more fully described in my copending application Serial No. 197,863 filed November 28, 1950, now U. S. Patent 2,611,085.

Feed back connection 7 connects the plate of tube 2 of stage II to the control grid tube 21 of stage I. Feed back connection 8 connects the plate of tube 24 of stage III to the control grid of tube 23 of stage II; and so on.

All trigger stages being at rest, tubes 21, 23, 25, . . . being unblocked and tubes 20, 22, 24, . . . being blocked, a negative pulse is applied to terminal 1. This actuation pulse can only act to block tube 21 to the control grid of which it is applied through resistor 38 and internal connection 26. This pulse cannot act through resistor 39 and internal connection 27 on tube 20 which at this time is in its off-condition. However, tube 20 will be placed into on-condition through delaying connection 27, by a positive pulse delivered from tube 21 when the latter arrives at off-condition. The positive pulse also delivered by tube 21 at coupling connection 2 towards the second trigger stage II, is not operative because of polarity as well as amplitude.

The second incoming pulse arriving at 1 resets first stage I to rest condition, since it acts upon the unblocked tube 20 which will be blocked. Tube 21 will be unblocked and delivers a negative pulse which acts upon tube 23 of the second stage, which is thus driven to its off-condition. When driven to its on-condition, tube 22 delivers a negative pulse to feed back connection 7. This pulse when arriving at the control grid of tube 21—now unblocked—will block this tube and thus reset trigger stage I to its work condition. The operation is similar for further incoming pulses.

At the first pulse for instance, stages I and II are reset to rest condition, which brings stage III into work condition. When stage II is brought to rest, it will be noticed that the pulse delivered at feed back connection 7 is positive and therefore will not act upon tube 21 which is unblocked. However, stage III will deliver a negative pulse to feed back connection 8, which resets the stage II to work condition; tube 22 of stage II delivers a negative pulse to feed back connection 7 which resets stage I to work condition.

Figure 3:
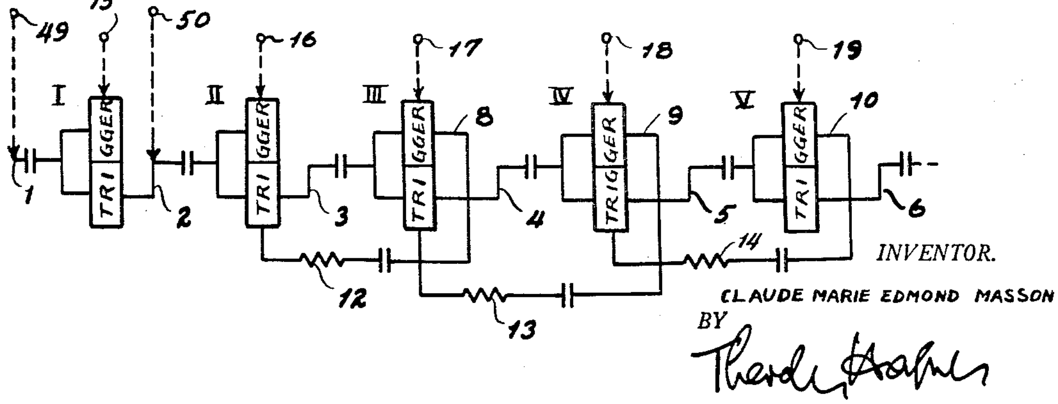
Fig. 3 shows an electronic decade counter according to the invention, in a conventional representation of its trigger stages.

If now feed back connection 7 is omitted from stage II and if the electronic counter comprises only five trigger stages as in Fig. 3, such counter constitutes a decade counter, that is to say that it is reset to a general zero or rest condition each time ten incoming pulses have been counted at 1. The tenth pulse ensures delivery at output terminal 6 of a "carry" pulse which may be directed for instance towards a further decade counter. The first stage I will deliver an actuation pulse to the following stage II only after having received a pair of incoming pulses. The first pulse of each pair drives stage I to its work condition, the second resets it to rest condition thereby actuating stage II when such second pulse is received. If "0" denotes the rest position of any stage and "I" the work condition, it is easy to check the operation of the decade counter of Fig. 3 according to the following table:

| Trigger stages | I | II | III | IV | V |
|---|---|---|---|---|---|
| Incoming pulse: | | | | | |
| (0) | 0 | 0 | 0 | 0 | 0 |
| (1) | 1 | 0 | 0 | 0 | 0 |
| (2) | 0 | 1 | 0 | 0 | 0 |
| (3) | 1 | 1 | 1 | 0 | 0 |
| (4) | 0 | 1 | 1 | 0 | 0 |
| (5) | 1 | 1 | 1 | 0 | 0 |
| (6) | 0 | 1 | 1 | 1 | 0 |
| (7) | 1 | 1 | 1 | 1 | 0 |
| (8) | 0 | 1 | 1 | 1 | 1 |
| (9) | 1 | 1 | 1 | 1 | 1 |
| (10) | 0 | 0 | 0 | 0 | 0 |

The resetting of stage V to rest condition causes delivery of an output pulse while the whole decade counter is cleared.

From the above table it is apparent that the number of trigger stages in work condition—condition "1" from stage II on, is equal to the number of pairs of incoming pulses which have been counted; the condition of the first trigger stage is an indication if this number is a round-off one, or if an additional pulse is to be taken into consideration. It can be said, in effect, that the first stage has a digit value equal to 1 whereas any of the stages II to V represent a digit value equal to 2, in numerical digital values of code. In other words, the operation of such a decade counter defines a numerical code of five code elements, the digits of which represent the sequence of values 1 2 2 2 2 for expressing the numbers from 0 to 9.

Two actuation inputs can then be provided, as indicated at 49 and 50, Fig. 3, for the introduction in the decade counter of coded trains of pulses having five code elements of digital values 1 2 2 2 2. The first code element is applied to input terminal 49 and the four following code elements to terminal 50, for instance by means of an electronic switching or gating arrangement of any well-known type for the time-distribution of electrical pulses. Such a decade arrangement can be used for the registration and totalization of coded trains of pulses of the kind here-above specified. A gating arrangement for introducing such trains can comprise an input channel to two input transfer gating stages; one connected by its output to terminal 49 is unblocked only for the first code element of the trains; the other connected by its output to terminal 50 is unblocked only for the four last code elements of these trains.

Figure 4:
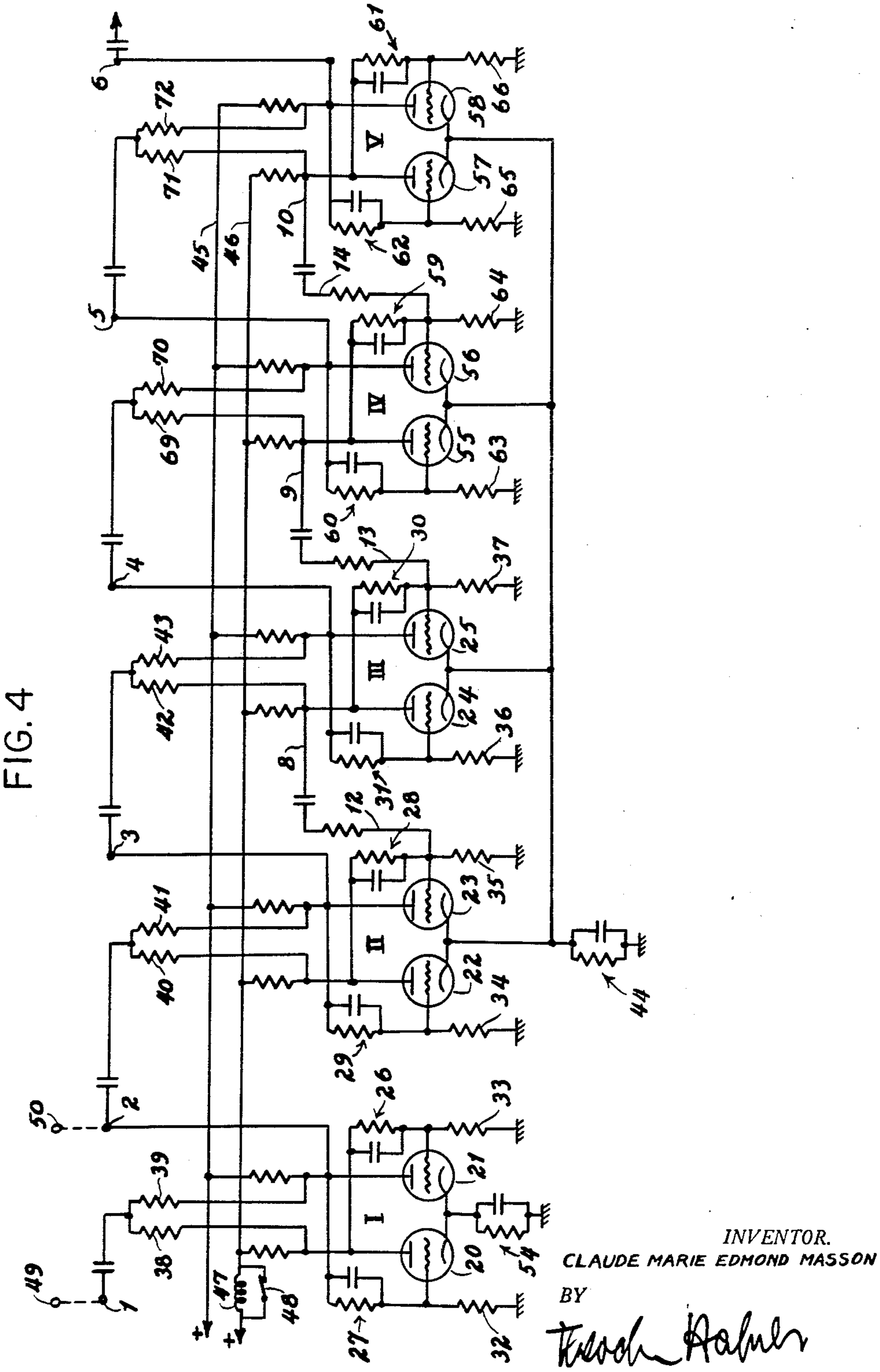
Fig. 4 illustrates an embodiment of the decade counter of Fig. 3.

Fig. 4 shows a corresponding electronic arrangement of a decade counter according to Fig. 3, embodying trigger stages I to V of the same conception as those of Fig. 2. The numerical references of elements are the same as in Fig. 2 for the first three stages except that feed back connection 7 between second and first stages, or more precisely between the plate of tube 22 and the control grid of tube 21 has been omitted. Stage IV comprises two tubes 55 and 56 coupled by means of intervalve networks 59 and 60; grid resistors are shown at 63 and 64, and input resistors at 69 and 70. Feed back connection 9 extends from the plate of tube 55 through network 13 to the control grid of tube 25 of third stage. Stage V comprises two tubes, 57 and 58, with plate-to-grid interconnections 61 and 62, grid resistors 65 and 66, and plate drive resistors 71 and 72. Feed back connection 10 to stage IV extends from the plate of tube 65 through network 14 to the control grid of tube 56 in the fourth stage.

Starting from a general condition of rest of the decade, and in accordance with the above table, the first pulse applied at 1 sets to work the first trigger stage; tube 21 off and tube 20 off. The second applied pulse resets stage I to rest; tube 21 on and tube 20 off, and drives stage II to its work condition; tube 23 off and tube 22 on. The second stage is then the only one in work condition in the decade arrangement.

The third incoming pulse at 1 is applied to stage I, now in rest condition, and sets this stage to work condition. The fourth incoming pulse resets stage I to rest, thus setting stage III to work: tube 25 off, tube 24 on; this last tube delivers to feed back connection 8 a negative actuation pulse which resets stage II to work. After reception of the fourth incoming pulse, stage I is at rest, and stages II and III are at work.

This alternate control of progression in the decade counter for each couple of incoming pulses is carried on until all trigger stages have been set to work, i. e. after the ninth incoming pulse at 1. The tenth incoming pulse resets to rest condition all stages in cascade, from I to V. The last stage, V, delivers an output pulse at 6 but since it remains in rest condition, it does not change the rest condition of the preceding stages. The counter is marking zero while it suplies an output signal which, if applied to a further decade counter, will introduce the numerical value 1 in such further decade.

For example the decade of Fig. 4 may be driven by means of an incoming coded pulse train of pulses involving five code elements of the digital values specified above and having the configuration 1 1 1 1 0 thus representing number 7.

The first code element in which there is a discrete pulse is applied to terminal 49, and thereby stage I is set to its work condition. The second code element in which there is also a discrete pulse, is applied to terminal 50, and actuates to work stage II. The third code element also carrying a discrete pulse is applied at 50, and resets to rest stage II; thereby the third stage III triggered and through feed back network 12, stage II is set to work. The fourth code element, after having reset to rest, in cascade, stages II and III sets to work stage IV, which, in a reverse cascade progression, resets to work both stages III and II. The fifth code element, carrying no discrete pulse, does not change the overall setting of the counter.

The decade counter, at this time, marks the condition 1 1 1 1 0, that is to say the numerical value 7 in the code concerned 1+2+2+2+0=7.

Considering then a second coded train applied to the counter carrying for instance the numerical value 2, and having then the configuration 0 1 0 0 0, only the second code element applied at 50 presents a discrete pulse. That pulse resets stage II to rest which was in its work condition. Stage II delivers an actuation pulse transmitted to stage III, which returns to rest and delivers an actuation pulse transmitted to stage IV which also returns to its rest condition, delivering an actuation pulse setting to work the last stage V. Stage V, in triggering from rest to work, initiates the backward progression of resetting and finally the decade counter presents all its trigger stages in work condition, 1 1 1 1 1 representing the numerical value 9=7+2 in the numerical code concerned.

Restarting from the condition into which the decade counter was brought after reception of the first coded train—a condition in which the count was 7 represented as 1 1 1 1 0—and applying a new coded train representing for instance numerical value 6 and configuration 0 1 1 1 0 the totalization process can be stated as follows:

The second code element applied at 50 represents a discrete pulse which triggers stage II. Stage II on being set to rest condition, triggers in a cascade progression from left to right, all stages III, IV and V. This last stage V, in reverse cascade progression, resets to work stages IV, III and II. The count is then 9 since the second code element has a digital value equal to 2, and the previous count was of 7.

The third code element applied at 50 presents a discrete pulse which resets to rest stage II; the cascade progression is initiated. Stages III, IV and V are reset to their rest condition, but stage V in resetting delivers an output pulse at 6 which is a carry over pulse for the count of the tens. No reverse cascade progression is initiated, stage V remaining at rest, and the counter then contains the numerical value 1, its first stage I being the only stage at work. This numerical value 1 is the unit digit of the added numerical value 7+4=11.

The fourth code element also applied at 50 represents a discrete pulse which resets to work stage II of the decade counter. The counter marks 1 1 0 0 0 which correctly represents the numerical value of the unit digit of the added values 7+6=13.

For counting incoming pulses applied at 1 only, the arrangement of the decade of Fig. 3 could be realized in reversed order. In such an arrangement the four stages which constitute the stey-by-step counter form the four first stages of the decade, and the fifth trigger stage acting as a binary or scale-of-two stage is placed at the end without any feed back connection to the next preceding stage.

The decade count will then be effected according to the following table:

| Trigger stages | I | II | III | IV | V |
|---|---|---|---|---|---|
| Incoming pulses: | | | | | |
| (0) | 0 | 0 | 0 | 0 | 0 |
| (1) | 1 | 0 | 0 | 0 | 0 |
| (2) | 1 | 1 | 0 | 0 | 0 |
| (3) | 1 | 1 | 1 | 0 | 0 |
| (4) | 1 | 1 | 1 | 1 | 0 |
| (5) | 0 | 0 | 0 | 0 | 1 |
| (6) | 1 | 0 | 0 | 0 | 1 |
| (7) | 1 | 1 | 0 | 0 | 1 |
| (8) | 1 | 1 | 1 | 0 | 1 |
| (9) | 1 | 1 | 1 | 1 | 1 |
| (10) | 0 | 0 | 0 | 0 | 0 |

The numerical code for expressing numerical values in five code elements, from 0 to 9, is then a code in which the consecutive digital values are 1 1 1 1 5. For recording and totalizing coded pulse trains representing numbers in such a code, the first four elements will be applied to an input of the first trigger stage, the fifth element of the code will be applied to the input of the last trigger stage of the decade.

Embodiment and operation of decade counters of this last kind are merely alternatives to those described above with reference to Figs. 3 and 4, and require no further detailed explanations.

Having now fully described and ascertained my invention, I declare that I claim:

1. In an electronic decade counter of electric pulses for recording and totalizing numerical values of coded pulse trains representing numbers in a five digit code one digit of which has a distinctive value with respect to the value of any of the other digits; said other digits having a uniform value and said distinctive value complementing to nine the sum of the values of said other digits; five bistable trigger stages connected in cascade arrangement, each trigger stage including a pair of electronic discharge tubes one of which controls triggering from rest to work, the other tube controlling triggering from work to rest; and an interstage capacitive coupling from the output of said first tube to the next following stage, said following stage having a symmetrical actuation input in which an applied pulse causes triggering from its set condition to the other; there being a feedback circuit provided in each of the three consecutive stages out of said five trigger stages not including the first stage, said feedback circuit extending from an output of said other tube in each of said three stages to the first tube in the next preceding stage, said first tube having an asymmetrical input; two actuation inputs for the incoming code digits, one of said inputs receiving all digits of said uniform value, the other of said inputs receiving only the digit of said distinctive value, symmetrical and asymmetrical inputs for a first stage, said first actuation input being connected to said symmetrical input, and a feedback circuit to said asymmetrical input; said second actuation input being connected to a stage which neither receives nor starts a feedback circuit from or to another stage of the decade, said latter stage having a symmetrical input connected to said actuation input, and said feedback circuit including means under control of said one stage for triggering back said next preceding stage to work each time said one stage itself is triggered from rest to work.

2. A decade counter according to claim 1 for recording and totalizing numerical values carried by coded pulse trains representing numbers in a five digit code the first of which represents the numerical value "one" while the four other digits represent each the numerical value "two,"

wherein the first trigger stage of the cascade arrangement of five stages does not receive a feedback circuit, feedback circuits being only provided for starting from the last three stages of said decade counter, and wherein the symmetrical input of the first trigger stage includes triggering means under control of incoming train pulses for receiving the first digit only of any incoming train and the symmetrical input of the second trigger stage is triggering means under control of the incoming train pulses for receiving the four following digits of any incoming train.

3. A decade counter according to claim 1 for recording and totalizing numerical values carried by coded pulse trains representing numbers in a five digit code, the four first digits representing the numerical value "one" while the fifth digit represents the numerical value "five," wherein the first trigger stage of the cascade arrangement of five stages does not receive a feedback circuit, feedback circuits being only provided for starting from the last three stages of said decade counter, and wherein the symmetrical input of the first trigger stage is adapted for reception of the first four digits of code of any incoming train and the symmetrical input of the fifth trigger stage is adapted for reception of the fifth digit only of any incoming train.

References Cited in the file of this patent

UNITED STATES PATENTS

| | | |
|---|---|---|
| 2,521,788 | Grosdoff | Sept. 12, 1950 |
| 2,540,442 | Grosdoff | Feb. 6, 1951 |

OTHER REFERENCES

RCA Review, September 1946, vol. VII, No. 3, pages 441–443, Electronic Counters by Grosdoff.